United States Patent Office 2,706,189
Patented Apr. 12, 1955

2,706,189

SOLID POLYMERS OF PROPYLENE OXIDE

Malcolm E. Pruitt, Lake Jackson, and Joseph M. Baggett, Freeport, Tex., assignors to The Dow Chemical Company, Midland, Mich., a corporation of Delaware No Drawing. Application June 5, 1952,
Serial No. 291,964

15 Claims. (Cl. 260—45.95)

This invention relates to polymers of propylene oxide which are solid at room temperature and above. It also concerns oriented films made from such polymers.

As is well known, ethylene oxide may be polymerized to a variety of useful products which range from oily liquids to wax-like solids, depending on the degree of polymerization. The same is true of isobutylene oxide which, in the presence of boron trifluoride, is rapidly converted to a white wax. Quite in contrast, propylene oxide has heretofore shown little or no tendency to form solid polymers. This oxide is known to polymerize rapidly in the presence of alkalies or acids, and even explosively with Friedel-Crafts catalysts such as stannic chloride. However, the products have invariably been viscous liquids of a low degree of polymerization. The only approach to a solid polymer seems to have been that of H. Staudinger, who subjected the liquid polymer to low-temperature fractional crystallization. There was isolated a minor proportion of a semi-solid having an average molecular weight of about 8700 ("Die Hochmolekularen Organischen Verbindungen," Verlag Springer, Berlin, 1932, at p. 294–5). Theoretical studies have served only to rationalize the observed behavior of propylene oxide (C. Ellis, "The Chemistry of Synthetic Resins," Reinhold, New York, 1935, at p. 991–3).

In the present invention it has been found that, by using certain iron compounds as catalysts, propylene oxide may be converted in good yield to solid polymers having melting points above 50° C., often above 70° C., and average molecular weights over 100,000. These polymers are colorless to white resinous products with considerable crystallinity, and have specific gravities in the range 1.03 to 1.05. They are insoluble in and resistant to water and aqueous acids and alkalies, but are soluble in aromatic hydrocarbons and most oxygenated organic solvents. They may be molded into a variety of useful objects, and also may be employed as film-forming ingredients in coating compositions. They may also be molded or cast into clear, colorless films of good dielectric properties, high strength, good resistance to tearing, and with the property of remaining flexible at temperatures as low as −70° C. When films of the polymers are stretched at room temperature there is marked increase in strength and the resulting products exhibit a high degree of crystalline orientation in the direction of stretching. The films have value as wrapping materials.

The solid polymers of the invention may be made either by the homopolymerization of propylene oxide or by its copolymerization with up to an equal proportion by weight of another organic epoxide. Of the latter, ethylene oxide, epichlorohydrin, isobutylene oxide, 1,2-epoxy-butane, the two 2,3-epoxy-butanes, and styrene oxide (phenyl ethylene oxide) have all been found suitable. Polymerization may be carried out en masse or in a non-aqueous inert solvent or suspending medium.

The high molecular weight solid propylene oxide homo- and co-polymers, while stable in diffused light, in some instances become brittle on prolonged exposure to direct sunlight or ultraviolet radiation. This tendency may be offset by incorporating in the polymer a small proportion of a conventional phenolic or aromatic amine antioxidant of the type used for stabilizing rubber.

The catalysts employed in making solid propylene oxide polymers according to the invention are all compounds of iron, mainly those in which the iron is present as a hydrate or other coordination complex. Among the preferred catalysts are a number of apparently novel complex compounds made by the controlled reaction of an anhydrous ferric halide, such as ferric chloride, with a limited amount of propylene oxide. Other satisfactory catalysts are various iron-containing hydrates, namely ferric hydroxide (hydrated ferric oxide $Fe(OH)_3$), basic ferric acetate ($Fe(OH)(C_2H_3O_2)_2$), ferric chloride hexahydrate ($FeCl_3 \cdot 6H_2O$), and ferrous chloride tetrahydrate ($FeCl_2 \cdot 4H_2O$). Anhydrous ferric bromide is also operable. However, not all iron compounds may be used. Thus, powdered iron, ferric fluoride, hydrated ferric sulfate, and ferric nitrate nonahydrate appear to be without catalytic effect. On the other hand, anhydrous ferric chloride alone is too violent a catalyst, leading to rapid polymerization of propylene oxide with formation only of liquid polymers of the type heretofore known.

As stated, among the preferred catalysts are condensates of propylene oxide with anhydrous ferric chloride. These appear to be mixtures of complex salts containing these two components in definite molecular ratios. Analyses and conductiometric studies have tentatively identified the complexes as probably mixtures of $2FeCl_3 \cdot C_3H_6O$, $FeCl_3 \cdot C_3H_6O$, $FeCl_3 \cdot 2C_3H_6O$, and $FeCl_3 \cdot 3C_3H_6O$. These catalysts are made by adding propylene oxide very gradually with agitation to a body of anhydrous ferric chloride until vigorous exothermic reaction ceases. The temperature is maintained between −80° C. and +60° C., preferably below 30° C., by supplying cooling and by limiting the rate of adding propylene oxide to avoid overheating. The process is stopped when the addition of a further small proportion of propylene oxide results in no further immediate evolution of heat, a point usually reached when from 2 to 3 moles of propylene oxide have been added per mole of ferric chloride ($FeCl_3$).

To insure good temperature control during formation of the complex catalyst, the condensation is preferably carried out in the presence of an inert non-aqueous diluent medium. The latter may be either a solvent for the anhydrous ferric chloride, such as diethylether, or may be a non-solvent suspending medium such as n-hexane. The complex catalyst may, after condensation is complete, be used as produced, or may be purified and isolated as a solid by additional treatment. Further details of these catalysts, and their preparation, purification, and use, are given in our patent application Serial No. 291,965 filed simultaneously herewith, where such subject-matter is claimed.

The propylene oxide and other olefin oxide monomers polymerized in the invention need be only of ordinary commercial purity and may contain up to 0.2 per cent water and aldehyde or more without serious disadvantage. Where monomer of extreme purity is desired, traces of water may be removed by contacting the propylene oxide with anhydrous calcium sulfate for an hour or two, and then distilling. Aldehyde can be removed by fractional distillation of the oxide while in contact with alkali metal hydroxide.

In making solid polymers and copolymers of propylene oxide according to the invention, the monomer or mixtures of monomers and the catalyst may simply be charged together into a closed vessel and heated until polymerization is complete. The mixture is advantageously agitated during polymerization. The proportion of catalyst used is satisfactorily from 0.1 to 5 per cent by weight of the oxide to be polymerized, preferably 0.5 to 2 per cent. In general, the maximum yields of high molecular weight solid polymer are obtained with the lowest operable proportion of catalyst within the range given. Polymerization temperature is in the range 40° to 150° C., with 70° to 100° C. being preferred, and 80° about the optimum. Below 70 C. the polyemerization time becomes unduly long, whereas at much above 100° C. the yield of high molecular weight polymer is reduced. Within the 40° to 150° C. temperature range, the polymerization time may vary from 3 to 200 hours, the shorter times being at the higher temperatures. In the preferred range of 70° to 100° C., a time of 40 to 90 hours is usually sufficient to insure practical completion of the reaction.

Instead of effecting mass polymerization as just described, the procedure may be carried out with the oxide monomer, catalyst, and product all dissolved in an inert solvent. In general, roughly equal proportions of monomer and solvent are used. Preferred solvents are diethyl ether, diisopropyl ether, petroleum ether, benzene, and n-hexane. It is advantageous to choose a solvent which boils at about polymerization temperature, and to heat the solution to induce gentle reflux, thereby insuring close control of temperature. The presence of a solvent reduces slightly the rate of polymerization but favors conversion of a somewhat higher proportion of the monomer to the desired solid polymer.

The crude product resulting from the polymerization or copolymerization process, in addition to containing the desired solid resin, also contains whatever liquid polymers may have formed, residual oxide monomer, such solvent as was employed, and catalyst residue. This crude material is first warmed if necessary to vaporize off the unreacted monomer and the solvent. The resulting product, a tough rubbery mass of brown color, is treated in any convenient way to remove the iron-containing catalyst and to separate the desired solid resin from liquid polymer present. Preferably, the rubbery mass is dissolved in several volumes of solvent for the polymer, e. g. hot acetone, and the solution acidified, as with hydrochloric acid, to convert the iron-containing catalyst to soluble iron salts. The resulting clear yellow soluton is then chilled to a temperature sufficiently low to cause the solid polymer present to crystallize out of solution, e. g. below —20° C. The crystalline material may then be further purified by recrystallization from acetone, yielding white solid polymer having a molecular weight sufficiently high that its softening point is over 50° C.

In an alternative purification step, the acetone solution of the crude polymeric product may be treated with a small proportion of water to convert the iron-containing complex catalyst to an iron hydroxide precipitate. The latter may be removed by filtration, after which the polymer is recovered by crystallization.

The purified white solid polymer or copolymer of copolymer of propylene oxide, while useful per se, is preferably stabilized against decomposition on aging by incorporating therein a small proportion of an antioxidant of the type used in rubber compounding, i. e. a phenol or aromatic amine. Among the stabilizers which have been used satisfactorily are such phenols as 4,4'-isopropylidene diphenol (Bisphenol A), 4,4'-isopropylidene di-o-cresol (Bisphenol C), 4,4'-isopropylidene di-(o-isopropyl phenol) (Bisphenol G), 2,2'-dihydroxy 4,4'-dichlorodiphenylmethane, hydroquinone monobenzyl ether (Agerite alba), 2,6-ditertiary butyl-4-methyl phenol (Ionol), 2,2-methylene bis(4-methyl-6 tertiary butyl phenol) (Antioxidant 2246), N-p-hydroxy phenyl morpholine (Solux), various aryl oxy ketones (Flectol White) and condensation products of beta naphthol with organic bases (Albasan). Also used have been such aromatic amines as sym. di-betanaphthyl-para-phenylene diamine (Agerite White), phenyl beta naphthyl-amine (Agerite powder and Neozone D), polymerized trimethyl dihydroquinoline (Agerite Resin D), Ketone-diamine condensates (Aminox), and condensates of aniline and acetone (Flectol). The antioxidant is usually added in a proportion from 0.5 to 2 per cent by weight of the solid polymer. It is most conveniently introduced by mechanically mixing it into the solid resin, or by melting the latter, adding the stabilizer, and resolidifying the mixture by cooling. It may also be incorporated during the purification treatment by dissolving the antioxidant in the solvent from which the solid propylene oxide resin is being recrystallized. Another procedure is to mix the stabilizer into the resin immediately after recrystallization, while it is still softened with solvent.

The solid propylene oxide polymers and copolymers of the invention may readily be fabricated into film by conventional film-casting techniques, or by extrusion through a slit. In film-casting, the polymer is dissolved in a volatile solvent, such as tetrahydrofuran, and the solution is flowed onto a smooth flat surface. After evaporation of the solvent, a clear film may be stripped from the surface. The film may be stretched by applying tension, and will extend readily to a limit of about three-fold elongation. Above this value, further stretching involves elastic deformation and the force required for extension increases very rapidly. When the film has been stretched to this limit it is found to exhibit crystalline orientation in the plane of the film, the crystallites being oriented in the direction of stretching.

The solid resinous products of the invention may also be molded into films and other useful objects by the application of pressure and slight heat.

The following examples will further illustrate the invention, but are not to be construed as limiting its scope.

*Example 1*

A complex catalyst was prepared by dissolving 10 parts by weight of anhydrous ferric chloride in 50 parts of diethyl ether and adding gradually 10 parts of liquid propylene oxide while stirring and cooling to keep the temperature below 60° C. When condensation ceased, the product was warmed under vacuum to remove volatile matter, leaving a semi-solid brown residue.

This catalyst residue was charged into a glass-lined stirring autoclave together with 1000 parts of liquid propylene oxide. The mixture was heated at 80° C. with stirring for 88 hours, until polymerization was complete. There was obtained 940 parts of a brown rubbery solid polymer. This was dissolved in hot acetone and sufficient concentrated hydrochloric acid was added to convert the iron-complex present to soluble ferric chloride. The solution was chilled to —20° C., whereupon a solid polymer crystallized out of solution and was separated by filtration. This polymer was then recrystallized twice from acetone, there being finally obtained 250 parts of a fluffy white solid.

The white solid had a specific gravity 1.03 and a melting point of 70° C. Its molecular weight, as measured by a light-scattering method, was approximately 135,000. The polymer was soluble in hot acetone, hot methanol, ethanol, dioxane, benzene, toluene, carbon tetrachloride, tetrahydrofuran, methyl ethyl ketone, nitromethane, and isophorone. It did not dissolve, but swelled to a gel, in ether and ethyl acetate, and was insoluble in dimethyl formamide, monoethanolamine, lard and peanut oil. It was resistant to water and to aqueous acids and alkalies. A 4 per cent by weight solution of the polymer in benzene had a viscosity at 18° C. of 14.8 centistokes, corresponding to a specific viscosity of 19.4.

To a portion of the polymer, there was added one per cent by weight of 4,4'-isopropylidene diphenol as antioxidant, the whole being mixed together mechanically. The stabilized polymer was molded into a clear film and the film oriented by stretching longitudinally to approximately 300 per cent of its unstretched length. The oriented film had a tensile strength of 14,000 pounds per square inch at room temperature, and high tear strength. It had excellent low-temperature flexibility and good dielectric properties.

*Example 2*

A charge of liquid propylene oxide and 2.0 per cent by weight of ferric chloride hexahydrate ($FeCl_3 \cdot 6H_2O$) as catalyst was heated in a glass-lined stirring autoclave at 80° C. for 69 hours. The crude product was dissolved in five volumes of a mixture of equal parts by volume of acetone and straight-run gasoline, acidified with concentrated hydrochloric acid to render the iron salts soluble, and solid polymer was crystallized out of solution by cooling to —30° C. The solid polymer, after recrystallization from acetone, exhibited good filming properties. The overall yield of solid, based on propylene oxide charged, was 18 per cent.

A solution of 0.058 gram of the polymer in 10 ml. of benzene had a viscosity at 25° C. of 2.07 centistokes; a solution of 0.58 gram in 10 ml. of benzene had a viscosity at 25° C. of 316 centistokes.

*Example 3*

A ferric hydroxide (or hydrated ferric oxide) catalyst was prepared by treating an aqueous solution of ferric chloride with concentrated ammonium hydroxide in equivalent quantity. The resulting precipitate was separated by filtration, washed with acetone, and dried by warming under vacuum. It exhibited on analysis a 13.5 loss in ignition, and contained less than 0.05 per cent chloride. The iron content (Fe) was 60.6 per cent.

A charge of liquid propylene oxide and 2.0 per cent by weight of this ferric hydroxide catalyst was heated with agitation at 81° C. for 160 hours. The crude brown solid product was purified as in Example 1. The propylene oxide charged was 98 per cent converted to polymeric products, liquid and solid. The yield of high molecular weight solid polymer was 26.9 per cent.

Example 4

A series of polymerizations of propylene oxide in various solvents was carried out using as catalyst in each case 2.0 per cent by weight of a ferric chloride-propylene oxide complex prepared as in Example 1. The solvents used, in approximately equal proportion by volume to the liquid propylene oxide, were benzene, petroleum ether, diethyl ether, diisopropyl ether, and n-hexane. Polymerization was in all instances at 80° C. for 163 hours. In every case, the propylene oxide was entirely converted to polymeric products. Each crude product was treated as in the previous examples to isolate a white solid polymer having a melting point above 50° C. The percentage yield of solid polymer was as follows: benzene, 26.6; petroleum ether 27.2; diethyl ether, 29.2; diisopropyl ether, 26.7; and n-hexane, 25.1.

Example 5

A charge of 50 parts by weight of propylene oxide 50 parts of epichlorohydrin, and 1.9 parts of ferric hydroxide catalyst as in Example 3 was heated in a closed glass vessel with agitation at 80° C. for 168 hours. The resulting solid copolymer was recovered by crystallization from acetone as in the preceding examples. It had a melting point above 50° C.

Example 6

A series of copolymerizations of propylene oxide with other olefin oxides was carried out using as catalyst a ferric chloride-propylene oxide complex prepared as in Example 1. In all cases, the concentration of catalyst was 2.0 per cent by weight of the total monomeric material, and copolymerization was carried out for 221 hours at 80° C. In every instance the solid copolymer was isolated from the crude reaction product by the crystallization procedure of Example 1 and found to have a melting point above 50° C. Each was stabilized by mixing with 1 to 2 per cent by weight of 2.2-methylene bis(4-methyl-6-tertiary butyl phenol). Each copolymer was molded into a film, which was then oriented by stretching, as in Example 1.

The following table gives the identity and proportion of the comonomer in per cent by weight (balance being propylene oxide), the yield of solid copolymer, and the tensile strength (pounds per square inch) of the oriented film.

| Comonomer | Percent | Yield | Film strength |
|---|---|---|---|
| Ethylene Oxide | 6.1 | 16.5 | 7,500 |
| Do | 10.5 | 14.4 | 8,800 |
| Epichlorohydrin | 5.4 | 20.4 | 5,400 |
| Do | 10.0 | 12.8 | 6,600 |
| Styrene Oxide | 5.1 | 17.0 | 7,100 |
| Do | 10.3 | 14.1 | 5,600 |

Example 7

In preparing a complex catalyst, 10 grams of anhydrous ferric chloride was first dissolved in 175 ml. of diethyl ether. To this solution there was added slowly 60 ml. of liquid propylene oxide, the whole being stirred and cooled to maintain a temperature of 25° C. When addition was complete, volatile components were removed by evaporation under vacuum at room temperature. The residue, about 40 ml. of an oily red-brown material was dissolved in 50 ml. of acetone. This solution was then fractionated by adding 400 ml. of petroleum ether, which caused separation of a layer of about 40 ml. of a heavy red-brown oil. This oil was redissolved in an equal volume of acetone to provide a solution of the active catalyst.

The catalyst solution was used in a series of copolymerizations of propylene oxide with various proportions by weight of other olefin oxides as indicated in the following table. The concentration of catalyst in all cases was 2.0 per cent by weight. Copolymerization was at 80° C. for the times indicated. In each case, a solid copolymer was separated by fractional crystallization from acetone as in the previous examples. The yield of solid copolymer is given in the table. Each copolymer had a softening point above 50° C. and was molded into a film which was oriented by stretching.

| Comonomer | Percent of Total Monomer | Time (Hours) | Yield |
|---|---|---|---|
| Isobutylene Oxide | 10.3 | 112 | 29.8 |
| Do | 50 | 496 | 11.4 |
| 1, 2-Epoxy Butane | 10.7 | 113 | 25.5 |
| Do | 50 | 496 | 6.7 |
| Trans 2, 3-Epoxy Butane | 10.4 | 112 | 28.9 |
| Do | 52 | 496 | 11.8 |
| Cis 2, 3-Epoxy Butane | 10.3 | 112 | 30.2 |

Attention is directed to copending application Serial No. 291,966, filed simultaneously herewith, in which is claimed a process for polymerizing propylene oxide in the presence of certain ferric hydrates.

What is claimed is:

1. A solid polymeric resin composed of polymerized epoxides and containing at least 50 percent by weight of polymerized propylene oxide, the degree of polymerization being sufficiently high that the melting point is above 50° C.

2. A solid homopolymer of propylene oxide having a melting point above 70° C. and an average molecular weight above 100,000.

3. A solid crystalline resin composed of copolymerized epoxides and containing in combined form at least 50 percent by weight of propylene oxide and up to an equal proportion of another oxide selected from the class consisting of ethylene oxide, epichlorohydrin, isobutylene oxide, 1,2-epoxybutane, the two 2,3-epoxybutanes, and styrene oxide, the degree of polymerization being sufficiently high that the melting point is above 50° C.

4. As a new article of manufacture, a film of a solid polymeric resin composed of polymerized epoxides and containing at least 50 per cent by weight of polymerized propylene oxide, the degree of polymerization of which is sufficiently high that the melting point of the product is above 50° C., said film having been stretched to a degree sufficient to exhibit crystalline orientation in the plane thereof.

5. A film of a homopolymer of propylene oxide having an average molecular weight above 100,000 stretched to a degree sufficient to exhibit crystalline orientation in the plane of the film.

6. As a new article of manufacture, a film of a solid crystalline resin composed of copolymerized epoxides and containing in combined form at least 50 percent by weight of propylene oxide and up to an equal proportion of another oxide selected from the class consisting of ethylene oxide, epichlorohydrin, isobutylene oxide, 1,2-epoxybutane, the two 2,3-epoxybutanes, and styrene oxide, the degree of polymerization being sufficiently high that the melting point is above 50° C., said film having been stretched to a degree sufficient to exhibit crystalline orientation in the plane thereof.

7. A solid polymeric resin composed of polymerized epoxides and containing at least 50 percent by weight of polymerized propylene oxide, the degree of polymerization being sufficiently high that the melting point of the resin is above 50° C. stabilized against decomposition by having incorporated therein a small proportion of an antioxidant.

8. A solid homopolymer of propylene oxide having a melting point above 70° C. and an average molecular weight above 100,000 stabilized against decomposition by having incorporated therein approximately 0.5 to 2 per cent by weight of an antioxidant of the class consisting of phenols and aromatic amines.

9. A composition according to claim 8 wherein the antioxidant is 2,2'-methylene bis(4-methyl-6-tertiary butyl phenol).

10. A film of the composition defined in claim 8 stretched to a degree sufficient to exhibit crystalline orientation in the plane of the film.

11. A resin according to claim 3 having an average molecular weight above 100,000.

12. A resin according to claim 11 in which the other combined oxide is ethylene oxide.

13. A resin according to claim 11 in which the other combined oxide is epichlorohydrin.

14. A resin according to claim 11 in which the other combined oxide is an epoxybutane.

15. A resin according to claim 1 having an average molecular weight of at least 100,000.

References Cited in the file of this patent

UNITED STATES PATENTS

| | | |
|---|---|---|
| 2,481,278 | Ballard et al. | Sept. 6, 1949 |
| 2,484,370 | Ballard et al. | Oct. 11, 1949 |
| 2,516,960 | Coffman | Aug. 1, 1950 |
| 2,556,048 | Stanton et al. | June 5, 1951 |
| 2,641,614 | Britton et al. | June 9, 1953 |

FOREIGN PATENTS

| | | |
|---|---|---|
| 601,604 | Great Britain | May 10, 1948 |
| 610,505 | Great Britain | Oct. 18, 1948 |